Figure 1:
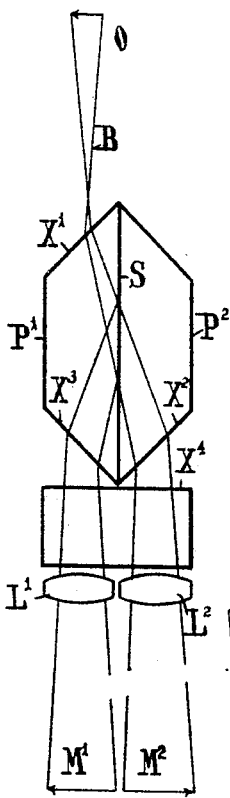

June 24, 1930.        J. F. ROMER        1,765,882
OPTICAL DEVICE FOR PHOTOGRAPHIC, CINEMATOGRAPHIC, AND OTHER PURPOSES
Filed March 31, 1927

INVENTOR.
J. F. Romer

Patented June 24, 1930

1,765,882

UNITED STATES PATENT OFFICE

JAMES FREDERICK ROMER, OF WEST HAMPSTEAD, LONDON, ENGLAND, ASSIGNOR TO JOHN EDWARD THORNTON, OF LONDON, ENGLAND

OPTICAL DEVICE FOR PHOTOGRAPHIC, CINEMATOGRAPHIC, AND OTHER PURPOSES

Application filed March 31, 1927, Serial No. 180,026, and in Great Britain May 28, 1926.

This invention relates to improved optical apparatus for photographic, cinematographic and other purposes.

*General description*

The primary object of the invention is to form a plurality of images arranged or disposed in adjacent areas of the same plane, the said images being of the same object, from the same point of view and therefore all alike as regards size, outline and details, such plurality of images being produced by this optical apparatus and a lens or lenses in conjunction with a camera upon a sensitized photographic plate or film or continuous cinematographic film.

The images so produced are in pairs which are complementary to each other, i. e. each image is the reflection of the neighboring image as seen in a plane mirror, and though of identical size and outline can be rendered different from each other by interposing suitable color filters in the paths of the light beams.

By such means color-component images can be formed upon a sensitive surface to represent a group of four colors, such as red, green, violet and yellow. Any other suitable combination of color components may be adopted. The invention can also be used for producing plurality-image groups of monochrome character known as two-tone or double-tone.

The plurality of images of the original scene produced by this optical device can be combined into a single image which may be utilized in either of the two following ways.

In the first method a group of component negative images produced by the apparatus upon plates or films can be recombined to form an enlarged positive picture by projecting them in superimposition upon a screen, by the aid of suitable projection apparatus, correct illumination of the plate or film, correct filters, and the optical apparatus and lens or lenses, all used in combination. Such enlarged positive will be of the type technically termed "additive."

In the second method a group of component positives are printed from the component negatives, and the positives are then combined by cementing them together, producing a single positive of the type technically termed "subtractive."

The optical apparatus which forms the subject matter of this invention is designed to be used in producing either of the beforementioned types of plates or films in which it is necessary to obtain reversed or complementary images.

Optical apparatus has been proposed for obtaining a pair of complementary images comprising two glass plates or prisms with a partially reflecting, partially transmitting surface between them. In such devices the axial ray of the incident beam strikes the device at right angles to such surface and moreover the length of the paths of the rays through the device are not equal, so that the images are formed in different planes.

*The present invention*

This invention relates more particularly to those processes of making color pictures in which separate color records are made upon separate plates or films which are afterwards superimposed and the colors of the original scene reproduced either additively or subtractively or by a combination of both methods by projecting light through the composite film and through color filters. Where it is desired for example to project pictures in four colors using a combination of additive and subtractive methods, the color records may be taken upon two separate films in such a manner that the pictures are in pairs on each plate or film, i. e. instead of taking consecutive pictures as is done in the black and white art, the pictures on each film are taken in consecutive pairs, the pairs on each film being erect on that film but reversed relatively to those on the neighbouring film, so that when the two films are superimposed face-to-face or back-to-back each composite picture forms a two color record through which light can be projected and two of the original colors of the scene reproduced upon the screen by the subtractive method. If now, light be projected through two such composite pictures, and if each composite picture is a record of two different colors, then on superimposing the light from both composite pictures on the screen I obtain a picture containing four colors, by a combination of additive and subtractive methods.

With the before mentioned method of superimposing it is necessary to take all the four color records simultaneously and it is consequently necessary to divide the incident beam of light from the object to be photographed into four parts so as to obtain four images of the object which are all erect but which are in two pairs which are reversed relatively to each other as before mentioned, and it is the object of the present invention to provide apparatus and means whereby this may be done.

Description of the optical apparatus

In carrying out my invention I make use of the physical properties of refraction through a transparent material combined with reflection and transmission from and through a surface which partially reflects and partially transmits light for the purpose of dividing the incident beam of light into two parts, each of these two beams is then further sub-divided into two other beams by transmission through and reflection from a second semi-transparent, semi-reflecting surface combined with reflection from a totally reflecting surface or surfaces, the second set of reflecting and semi-transparent, semi-reflecting surfaces being set in a plane at right angles to that of the first set, thus producing four beams of light which when focussed upon a screen or film produce four images which are erect and reversed in pairs as before described.

Figure 3:
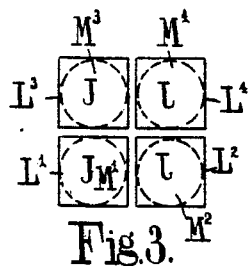
Figure 2:
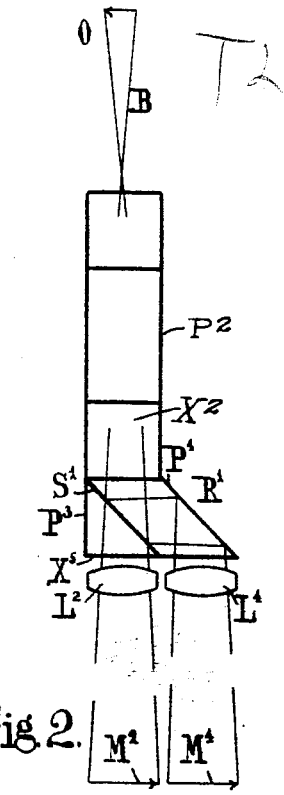
Figures 4, 5:
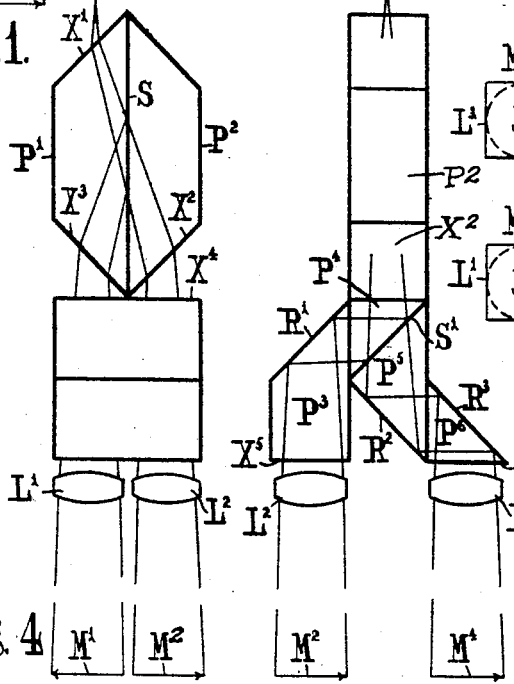
Figure 6:
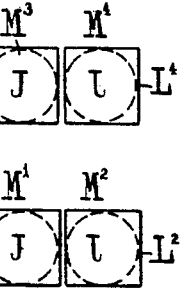

In the accompanying drawings which illustrate the invention Fig. 1 shows the arrangement of an optical system for producing four images erect and reversed as described. Fig. 2 is an elevation of Fig. 1 looking in the direction of the arrow A, Fig. 3 shows the manner in which the images produced are arranged, Fig. 4 shows a modified optical system; Fig. 5 is an elevation of Fig. 4 looking in the direction of the arrow A and Fig. 6 shows the arrangement of the images produced.

Referring more particularly to Figs. 1 and 2, O is the object to be photographed $P^1$ and $P^2$ are glass prisms which are cemented together at and enclosing the semi-transparent, semi-reflecting surface S, $P^3$ and $P^4$ are glass prisms cemented together at and enclosing the semi-transparent, semi-reflecting surface $S^1$, $L^1$, $L^2$, $L^3$ and $L^4$ are lenses, $M^1$, $M^2$, $M^3$, $M^4$ are the images produced. Light from the object O incident on the plane surface $X^1$ at an angle of approximately 45° is refracted and transmitted to the semi-transparent, semi-reflecting surface S, set parallel with the axial ray of the incident beam where it is divided into two parts giving two beams of light, one of which is transmitted to the surface $X^2$, the other being reflected and transmitted to the surface $X^3$, both beams emerging and then being incident upon the surface $X^4$ of the prism $P^4$; they are then transmitted to the semi-transparent semi-reflecting surface $S^1$ where they are each divided into two parts thus giving four beams, two of which are reflected from the surface $S^1$ and again reflected from the totally reflecting surface $R^1$, emerge at the surface $X^5$ and after passing through the lenses $L^3$ and $L^4$ are focussed and form the images $M^3$ and $M^4$ and two of which are transmitted through the surface $X^5$ and after passing through the lenses $L^1$ and $L^2$ are focussed and form the images $M^1$ and $M^2$, to give four images in square formation in the same plane.

The semi-transparent, semi-reflecting surfaces S and $S^1$ may be made in any known convenient manner; for example they may consist of reflecting strips separated by transparent spaces, made by silvering the glass and then scraping away part of the silver, or they may be made by depositing on the glass very thin films of any suitable metal such as silver, gold, palladium or platinum.

The lenses $L^1$, $L^2$, $L^3$ and $L^4$ may be any kind of lenses which will produce a real image, but preferably the properly compensated photographic objectives known as anastigmats.

The arrangement of the images produced is illustrated in Fig 3. In this case the images are arranged in square formation equal distances from each other, but it is sometimes desirable that, while retaining the square formation, the pairs of images on one film should be widely separated from the pairs on the other film as illustrated by Fig. 6, and Figs. 4 and 5 show the arrangement of an optical system for producing such separated pairs of images.

O is the object, $P^1$ and $P^2$ are truncated right angle prisms cemented together at and enclosing the semi-transparent, semi-reflecting surface S, $P^3$, $P^4$, $P^5$ and $P^6$ are prisms cemented together with a transparent cement such as Canada balsam, the prisms $P^4$ and $P^5$ enclosing the semi-transparent, semi-reflecting surface, $S^1$, $L^1$, $L^2$, $L^3$ and $L^4$ are lenses capable of forming real images and $M^1$, $M^2$, $M^3$ and $M^4$ are the images produced.

Light from the object O is incident upon the refracting surface $X^1$ at an angle of approximately 45°, is refracted and transmitted to the semi-transparent, semi-reflecting surface S set parallel to the axial ray of the incident beam where it is divided into two parts, one part being transmitted and emerging at the surface $X^2$, the other part being reflected and emerging at the surface $X^3$ thus producing two separate beams of light, both these beams are then incident upon the refracting surface X⁴, are refracted and transmitted to the semi-transparent, semi-reflecting surfaces S¹ where they are both divided into two parts thus producing four separated beams of light. Two of these beams of light are transmitted to the totally reflecting surface R², are reflected and transmitted to the totally reflecting surface R³, are again reflected and emerge at the refracting surface X⁶, and after transmission through the lenses L³ and L⁴ they are focussed and form the images M³ and M⁴. The other two beams of light are reflected from the semi-transparent, semi-reflecting surface S¹ are transmitted to the totally reflecting surface R¹, are reflected and transmitted to the refracting surface X⁵ where they emerge and after transmission through the lenses L¹ and L² are focussed and form the other pair of images M¹ and M² those giving four images in square formation in the same plane.

Although I have shown the apparatus illustrated by Figs. 4 and 5 with four lenses placed behind the prismatic blocks, the apparatus would function equally well with only one lens placed between the object O and the first refracting surface X¹.

With the apparatus illustrated by Figs. 1 and 2 placing the lens between the object O and the first refracting surface X¹, would have the result of making the length of path of two of the beams of light longer than that of the other two, consequently two of the images would be formed in a plane removed laterally from that of the other two images.

If it is desired to have all the images formed in the same plane, using only one lens placed between the object and the first refracting surface X¹, this can be accomplished by placing a rectangular polished block of glass behind the prism P³, the width and breadth of the said glass block being not greater than the width and breadth of that part of the surface X⁵ formed by the prism P³, and the length of the said glass block being such that the pair of images M¹ and M² are formed in the same plane as that of the pair of images M³ and M⁴.

*Additions and modifications*

Although the primary object of this invention is to produce a plurality of images of the original object and then to combine these images into a single picture of the object by either of the methods hereinbefore described for photographic and cinematographic purposes, it may be applied to any other purpose where it is desired to obtain a plurality of images and then to combine them.

The four images are produced upon a photographic or cinematographic sensitized surface of quadruple picture area, arranged in square formation.

The invention is applicable for the production of cinematographic (motion) pictures upon continuous strips, and also to ordinary (non-motion) pictures of miscellaneous types and sizes, lantern transparencies, and other forms of photographs, and for making original negatives, positives for exhibition, or intermediate printing-cliché reproductions.

What I claim as my invention and desire to protect by Letters Patent is:—

1. Optical apparatus for producing a plurality of complementary images from a single object comprising a right angle prism, a semi-reflecting semi-transparent layer coated upon the hypothenuse of said prism, a second right angle prism cemented by its hypothenuse to the hypothenuse of the first prism, the hypothenuses being arranged parallel to the axial ray of the incident beam, this ray striking the first prism at an angle of 45° refracted on to the hypothenuse and divided into two beams, two further prisms, semi-reflecting, semi-transmitting surface layers coated upon adjacent faces to divide each half beam into two, one half of each half beam passing through the said layers and emerging parallel with the axial ray of the incident beam, a totally reflecting surface on one of the prisms parallel to the said layers the other half of each half beam being reflected by the said layers and impinging upon the parallel surface from which they are reflected so that they also emerge parallel to the axial ray of the incident beam, to give four images in square formation in the same plane.

2. Optical apparatus for producing a plurality of complementary images from a single object comprising a right angle prism, a semi-reflecting semi-transparent layer coated upon the hypothenuse of said prism, a second right angled prism cemented by its hypothenuse to the hypothenuse of the first prism, the hypothenuses being arranged parallel to the axial ray of the incident beam this ray striking the first prism at an angle of 45° refracted on to the hypothenuse and divided into two beams, two further right angled prisms, semi-reflecting, semi-transmitting surface layers coated upon the hypothenuses of both to divide each half beam into two, one half of each half beam passing through the said layers and emerging parallel with the axial ray of the incident beam and another prism to receive the reflected half of the half beams and reflect them again so that they also emerge parallel to the axial ray of the incident beam to give four images in square formation in the same plane.

3. Optical apparatus for producing a plurality of complementary images from a single object comprising a right angle prism, a semi-reflecting, semi-transparent layer coated upon the hypothenuse of said prism, a second right angled prism cemented by its hypothenuse to the hypothenuse of the first prism, the hypothenuses being arranged parallel to the axial ray of the incident beam this ray striking the first prism at an angle of 45° refracted on to the hypothenuse and divided into two beams, two further right angled prisms, semi-reflecting, semi-transmitting surface layers coated upon the hypothenuses of both to divide each half beam into two one half of each half beam passing through the said layers and emerging parallel with the axial ray of the incident beam and another prism to receive the reflected half of the half beams and reflect them again so that they also emerge parallel to the axial ray of the incident beams and lenses through which the emerging beams pass to give four images in square formation in the same plane.

In testimony whereof I have hereunto set my hand.

JAMES FREDERICK ROMER.